Feb. 25, 1969 M. LEDERER ETAL 3,429,910
MANUFACTURE OF PEROXYDICARBONATES
Filed Nov. 7, 1966
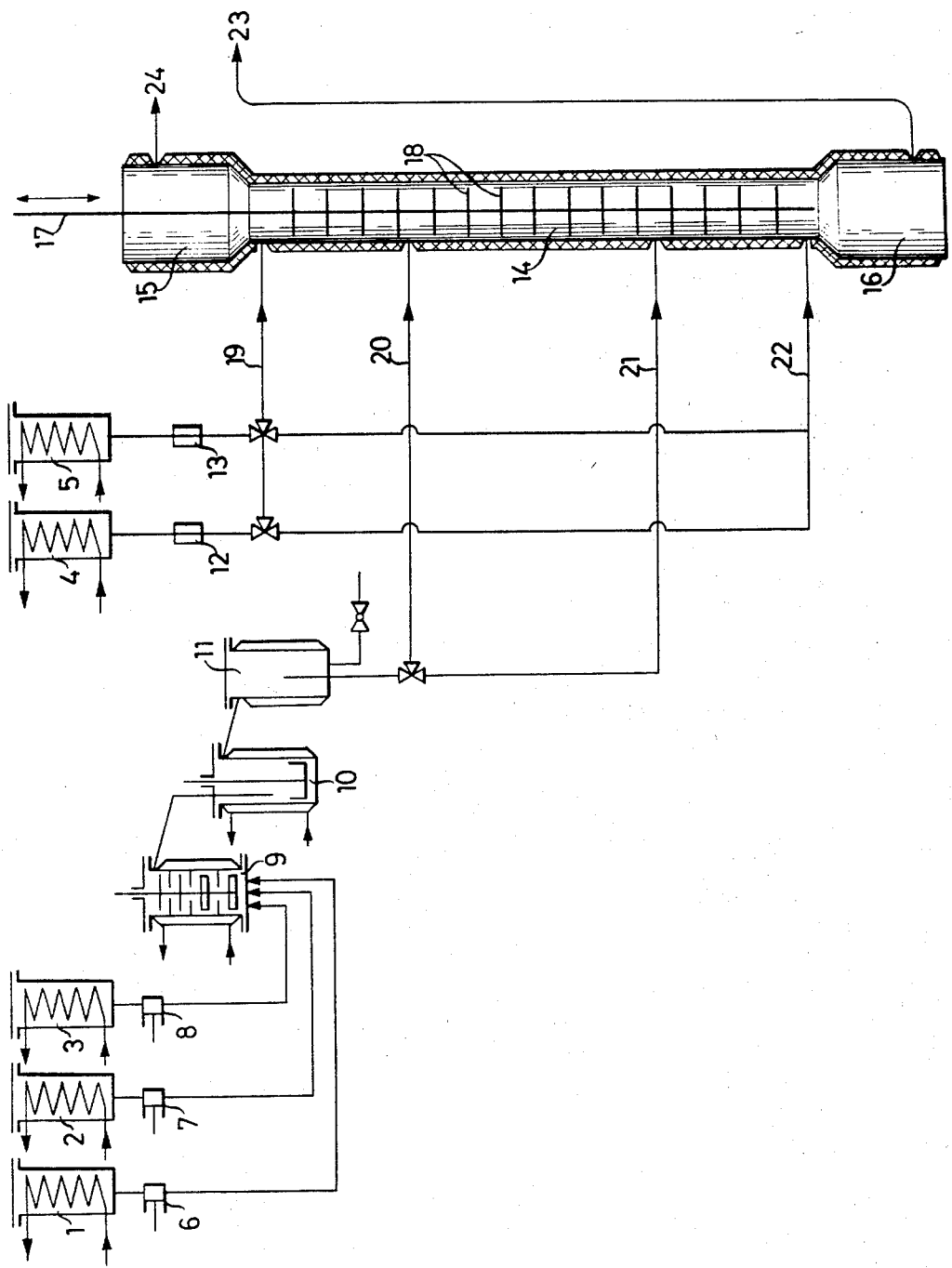
INVENTORS
MICHAEL LEDERER
HEINRICH LENZMANN
SIEGFRIED WAGENER
BY *Curtis, Morris & Safford*
ATTORNEYS 3,429,910
MANUFACTURE OF PEROXYDICARBONATES
Michael Lederer, Frankfurt am Main, Heinrich Lenzmann, Kelkheim, Taunus, and Siegfried Wagener, Sulzbach, Taunus, Germany, assignors to Farbwerke Hoechst Aktiengesellschaft vormals Meister Lucius & Bruning, Frankfurt am Main, Germany, a corporation of Germany
Filed Nov. 7, 1966, Ser. No. 592,449
Claims priority, application Germany, Nov. 15, 1965, F 47,677
U.S. Cl. 260—463   1 Claim
Int. Cl. C07c 69/00

In copending application Serial No. 458,042, now U.S. Patent No. 3,377,373, a process is described for the continuous manufacture of solutions of peroxydicarbonates of the general formula RO—CO—OO—CO—OR, in which R is an alkyl, chloroalkyl, alkenyl or chloroalkenyl group with 1 to 9 carbon atoms wherein a chlorocarbonic acid ester of the general formula Cl—CO—OR in which R has the meaning given above, is reacted with hydrogen peroxide and an alkali metal hydroxide solution at a temperature in the range of −10° C. to +30° C., the major part of the reaction is effected in a first reaction zone at a pH in the range of from 8 to 14, with intense mixing, the dispersion thus obtained is transferred into an after-reaction zone, in which the reaction is terminated, and the peroxydicarbonate obtained is taken up in a hydrogen-free, halogen-containing organic solvent or in a halogen-free hydrocarbon that is liquid under normal conditions.

In this process the peroxide solution is purified and isolated either discontinuously in two settling vessels in parallel connection and a following washing vessel, or continuously in several pairs of mixers and separators.

It has now been found that the peroxide solution can be purified and isolated in a more advantageous manner when the purfication and isolation is performed continuously in a column with vibratory plates.

A suitable column with vibratory plates is diagrammatically represented in the accompanying drawing.

As mixing element perforated plates 18 are used which are fastened on shaft 17 and vertically moved up and downward.

The reaction is carried out in a device as shown in the accompanying drawing. The device consists of containers 1 to 5, metering devices 6, 7, and 8, reactors 9 and 10 and processing devices 11 to 24. The containers can be made of glass, enamel or other suitable materials. They are cooled by jacket cooling or by means of installed cooling coils.

The cylindrical reactor 9 made of a suitable material, for example stainless steel, is provided with a jacket through which a cooling brine is conducted. In the bottom of the reactor three inlets are installed for the separate introduction of the starting components. The reactor is subdivided in the way of a cascade by several perforated intermediate bottoms into directly interconnected chambers, preferably three to six. The two lower chambers are provided with two or several high speed stirring means, for example toothed rim impellers, rotor cage impellers or similar high speed impellers, while in each of the other chambers a high speed disk impeller or a low speed perforated blade agitator, an anchor stirrer or an agitator with like effect is installed. The cover of the reactor is provided with a thermometer and means for taking samples.

Reactor 9 is connected with reactor 10 which is made of a suitable material and likewise provided with a cooling jacket. In reactor 10 a stirring means is installed, preferably an impeller or an analogous stirrer. The transfer pipe from reactor 9 to reactor 10 reaches below the level of the liquid in the latter. Reactors 9 and 10 may have the same size or different dimensions. Reactor 10 is connected via separating vessels 11 and pipeline 20 with vertical cylinder 14. Container 4 for the organic solvent and container 5 for water are connected with vertical cylinder 14 via pipelines and metering devices 12 and 13, respectively.

The three starting components, chlorocarbonic acid ester, aqueous sodium hydroxide solution and hydrogen peroxide are metered in by means of suitable metering devices, advantageously diaphragm or piston pumps, or rotameters. Small amounts, particularly of hydrogen peroxide, can also be metered in by means of calibrated vessels with dropping devices.

The components chloroformic acid ester, aqueous sodium hydroxide solution, preferably having a content of NaOH of 15 to 30% by weight, and hydrogen peroxide of 10 to 60% strength are introduced into reactor 9 at the bottom through pipes from containers 1, 2 and 3 and via metering devices 6, 7 and 8. The components are mixed in a ratio of 0.9 to 1.1, advantageously 1.0 mol of $H_2O_2$; 2.0 to 2.2, advantageously 2.0 mols of chloroformic acid ester; 1.9 to 2.4, advantageously 2.0 mols of NaOH in the form of an aqueous solution.

The reaction mixture is colloidally distributed by means of stirring devices. The reaction heat is dissipated through the jacket of reactor 9. The temperature of the cooling brine depends on the amount of reaction mixture put through. It is preferably in the range of from 0 to −20° C. The temperature of the reaction mixture is maintained in the range of from 4 to 10° C. and advantageously 6 to 8° C. The pH of the reaction mixture is adjusted to 8–14, preferably 10.5–12.5. After having been reacted in reactor 9, the reaction mixture is transferred to reactor 10 the cooling jacket of which has a temperature of −5 to +8° C., advantageously 0 to +5° C.

After the reaction of the halogenated carbonic acid ester with sodium hydroxide solution and hydrogen peroxide, the reaction mixture is transferred from the reactor 10 into a separating vessel 11 in which the aqueous salt solution is separated from the reaction product. Separating vessel 11 has two separate outlets for the two liquid phases formed. The aqueous phase is removed from the reaction system. The reaction product and the organic solvent are conducted, advantageously through separate conduits, into the column with vibratory plates. The column consists of a vertical cylinder 14 with two separating chambers 15 and 16. It is made of an appropriate material, for example stainless steel or glass, and surrounded by a cooling jacket.

The solvent is taken from container 4. Suitable solvents are hydrogen-free, halogen-containing compounds such as carbon tetrachloride, monofluorotrichloromethane, trifluorotrichloroethane, tetrafluorodichloroethane, or octafluorocyclobutane. In some cases halogen-free solvents may be used, for example pentane, hexane, heptane, or hydrocarbons of higher molecular weight or terpene derivatives. The organic solvents may be added to the reaction mixture prior to the separation of the aqueous phase.

When a solvent having a higher specific gravity than water is used, the reaction product is supplied through conduit 20 and the solvent is supplied through conduit 19 and sink downward in countercurrent flow with the wash water introduced through conduit 22. By the lifting movement of the perforated plates the exchange between the two phases is promoted. In separating chamber 16 the percarbonate solution separates from residues of water. The solution flows off through overflow 23, the height of which is determined by the ratio of aqueous phase to organic phase in the column. The wash water flows off through overflow 24.

When a solvent having a lower specific gravity than water is used, the reaction product is supplied through conduit 21, the solvent is supplied through conduit 22 and the wash water is fed through conduit 19. The purified percarbonate solution flows off through overflow 24 and the wash water flows off through overflow 23. All conduits through which peroxide or the peroxide solution are conveyed are surrounded by a cooling jacket. The cooling jackets of the counter-current extraction column and of the conduits are connected with a cooling system through which cooling brine having a temperature of 0 to +5° C. is conducted.

The washed peroxide solutions are dried with inert drying agents, such as magnesium sulfate or sodium sulfate, or by phase separation with the aid of centrifuges.

The peroxides are obtained in the form of solutions of about 40 to 50% strength. The advantage of the process of the invention resides in that a small apparatus readily decomposable peroxydicarbonates, which represent highly effective catalysts, can be prepared in continuous manner without danger.

We claim:
1. In a process for the continuous manufacture of solutions of peroxydicarbonates of the general formula RO—CO—OO—CO—OR in which R is an alkyl, chloroalkyl, alkenyl or chloroalkenyl group with 1 to 9 carbon atoms, a chlorocarbonic acid ester of the general formula Cl—CO—OR in which R has the meaning given above is reacted with hydrogen peroxide and an alkali metal hydroxide solution at a temperature in the range of −10 to +30° C., the major part of the reactants is reacted in a first reaction zone at a pH ranging from 8 to 14 with intimate mixing, the dispersion obtained is transferred into an after-reaction zone in which the reaction is terminated and the peroxydicarbonate obtained is taken up in a hydrogen-free, halogen-containing organic solvent or a halogen-free hydrocarbon that is liquid under normal conditions, the improvement of performing the purification and isolation of the peroxide solution in a column with vibratory plates, said plates being maintained in vertical upward and downward motion.

References Cited
UNITED STATES PATENTS 3,377,373   4/1968   Lederer et al.

JOSEPH P. BRUST, *Primary Examiner.*